United States Patent
Sun et al.

(10) Patent No.: US 11,987,941 B2
(45) Date of Patent: May 21, 2024

(54) PIER SCOUR PROTECTION METHOD BY COMBINATING A DOWNWARD BIVARIATE NORMAL DISTRIBUTION SURFACE AND GRANULAR MIXTURE

(71) Applicant: ZHEJIANG UNIVERSITY, Zhejiang (CN)

(72) Inventors: Zhilin Sun, Hangzhou (CN); Yizhi Sun, Hangzhou (CN); Haiyang Dong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 168 days.

(21) Appl. No.: 17/723,461

(22) Filed: Apr. 19, 2022

(65) Prior Publication Data
US 2022/0235524 A1 Jul. 28, 2022

Related U.S. Application Data

(63) Continuation of application No. PCT/CN2021/072817, filed on Jan. 20, 2021.

(30) Foreign Application Priority Data

Jan. 12, 2021 (CN) .......................... 202110035631.7

(51) Int. Cl.
*E01D 19/02* (2006.01)
*E02B 3/02* (2006.01)
*E02B 17/00* (2006.01)

(52) U.S. Cl.
CPC ................ *E01D 19/02* (2013.01); *E02B 3/02* (2013.01); *E02B 17/0017* (2013.01)

(58) Field of Classification Search
CPC ... E02B 3/04; E02B 3/023; E02B 3/02; E02B 17/0017; E01D 19/02; E01D 22/00; E02D 31/06; E02D 37/00

(Continued)

(56) References Cited

U.S. PATENT DOCUMENTS 4,717,286 A * 1/1988 Loer ...................... E02B 17/00
  405/74
5,762,448 A * 6/1998 Bilanin ............... E02B 17/0017
  405/211

(Continued)

FOREIGN PATENT DOCUMENTS

CN  1558975 A  12/2004
CN  101985838 A  3/2011

(Continued)

OTHER PUBLICATIONS

International Search Report (PCT/CN2021/072817); Date of Mailing: Oct. 9, 2021.

(Continued)

*Primary Examiner* — Frederick L Lagman
(74) *Attorney, Agent, or Firm* — W&G Law Group

(57) ABSTRACT

Provided is a pier scour protection method by combinating a downward bivariate normal distribution surface and a granular mixture, wherein the method is used for protecting a pier foundation of a sea-crossing or river-crossing bridge from scouring, and when a depth of a local scour hole around the bottom of a pier or a bridge pile reaches a set depth, a downward bivariate normal distribution surface protection structure is laid, and the granular mixture with a specific thickness is laid in the downward bivariate normal distribution surface protection structure. A downward bivariate normal distribution surface structure for defending and a granular mixture layer for weakening horseshoe-shaped vortexes in a scour hole are organically combined, the bivariate normal distribution surface structure is mainly used for defending the downflow in front of the pier, and the granular mixture layer can weaken the horseshoe-shaped vortexes around the piers.

6 Claims, 1 Drawing Sheet

(58) Field of Classification Search
USPC ............... 405/15, 16, 17, 73, 74, 211, 211.1
See application file for complete search history.

(56) References Cited

U.S. PATENT DOCUMENTS

| | | | |
|---|---|---|---|
| 8,348,553 | B2 | 1/2013 | Simpson et al. |
| 8,596,919 | B2 * | 12/2013 | Harris ..................... E02D 27/42 405/211 |
| 2004/0265060 | A1 * | 12/2004 | Lee ......................... E01D 19/02 405/16 |
| 2016/0083925 | A1 | 3/2016 | Simpson et al. |

FOREIGN PATENT DOCUMENTS

| | | | | | |
|---|---|---|---|---|---|
| CN | 102864756 | A | | 1/2013 | |
| CN | 204000580 | U | | 12/2014 | |
| CN | 104480961 | A | * | 4/2015 | ............ E02D 27/12 |
| CN | 204551240 | U | | 8/2015 | |
| CN | 104895007 | A | | 9/2015 | |
| CN | 204645105 | U | | 9/2015 | |
| CN | 205917727 | U | | 2/2017 | |
| CN | 106812159 | A | | 6/2017 | |
| CN | 108411802 | A | | 8/2018 | |
| CN | 108867343 | A | | 11/2018 | |
| CN | 110485313 | A | * | 11/2019 | |
| CN | 110804957 | A | | 2/2020 | |
| CN | 111236290 | A | | 6/2020 | |
| CN | 111926805 | A | | 11/2020 | |
| CN | 111926806 | A | * | 11/2020 | |
| CN | 212001298 | U | | 11/2020 | |
| CN | 112160288 | A | | 1/2021 | |
| CN | 112746556 | A | | 5/2021 | |
| CN | 215562387 | A | | 1/2022 | |
| CN | 114960776 | A | * | 8/2022 | |
| CN | 115142427 | B | * | 11/2022 | |
| JP | 61277708 | A | * | 12/1986 | |
| JP | 2007332620 | A | | 12/2007 | |
| KR | 100982023 | B1 | | 9/2010 | |

OTHER PUBLICATIONS

CN First Office Action(202110035631.7); Date of Mailing: Aug. 31, 2021.
CN Notice Of Allowance(202110035631.7); Date of Mailing: Mar. 2, 2021.
Dynamic simulation of local scour around bridge piers and scouring characteristics of piers with different cross sections; Date of Mailing: Jun. 30, 2018.
Research on Scour Protection of Bridgepiers of Sutong Bridge; Date of Mailing: Jun. 30, 2020.
Research of the Formula of Local Scour Depth at Bridge Piers Under Tidal Flow; Date of Mailing: Feb. 8, 2018.
Three-dimensional numerical simulation of flow around spur dike with bivariate normal surface; Date of Mailing: Jun. 30, 2016.

* cited by examiner

PIER SCOUR PROTECTION METHOD BY COMBINATING A DOWNWARD BIVARIATE NORMAL DISTRIBUTION SURFACE AND GRANULAR MIXTURE

CROSS-REFERENCE TO RELATED APPLICATIONS

The present application is a continuation of International Application No. PCT/CN2021/072817, filed on Jan. 20, 2021, which claims priority to Chinese Application No. 202120077345.2, filed on Jan. 12, 2021, the contents of both of which are incorporated herein by reference in their entireties.

TECHNICAL FIELD

The present application belongs to the field of protection of bridge foundation, and in particular relates to a pier scour protection method by combinating a downward bivariate normal distribution surface and granular mixture.

BACKGROUND

The local scour around the pier of a cross-sea (river) bridge has great influence on the safety of the bridge foundation, which is the main cause of bridge damage. Bridge collapse caused by local scour around the pier accounts for more than half of the total. Therefore, it is very important to effectively and fully protect the pier from local scour There are three causes of the local scour of the pier by water flows: (1) the water blocking of the pier leads to the increase of the velocity of the surrounding water flows, which means that when a water flow encounters obstacles, the cross-sectional area of the water flow decreases, causing the local velocity to increase, and the bed sediment is scoured to form scour holes; (2) the undercutting of the bed surface by the down flow mainly refers to the bed surface scour under the downflow which formed after the forward flow hits the pier; (3) horseshoe-shaped vortex scour, namely part of the sediment around piers are swept away by the horseshoe-shaped vortexes which formed when water flows bypass obstacles.

The local scour protection measures of piers are mainly divided into two categories: (1) active protection, in which measure the energy of water flow that scours sediment around the pier is reduced, that is, the downflow and horseshoe vortex in the process of scouring are weakened measures such as enlarging the foundation plane of the pier or setting foot guards are usually adopted to reduce the scouring energy of water flows; (2) passive protection, in which measure the scour prevention ability of the bottom bed near the pier is improved, by piling ripraps or wave dissipating concrete blocks around the pier foundation.

Existing protective measures have some drawbacks, such as high cost, poor protective effect and incapability of effectively defending typhoon storm surge and other disastrous marine environments. The active protection measures of expanding the top surface of the pier foundation can cope with the downflow under normal water flows. However, in an extreme hydrodynamic environment, the bed surface is seriously scoured and decreased, which causes the pier foundation to be completely exposed on the bed surface, thus forming stronger downflow on the upstream surface of the pier foundation, resulting in more serious local scour. The slits of the pier body can weaken the strength of horseshoe-shaped vortexes. If there are too many slits, the strength of the pier will be reduced; if there are too few slits, the effect will be poor, and the slits may be blocked by floating objects. When the direction of the approaching water flow around the pier is inconsistent with the direction of the slits due to rotating flow or mainstream swing and the like, the slits will lose their protective effect.

Riprap protection has always been the most widely used passive protection form for piers of large and medium-sized bridges, with the disadvantages of eddy current enhancement, poor protection effect, high operation and maintenance cost and large workload, etc. Especially, under the action of an extreme hydrodynamic force, strong vortexes are formed around ripraps, which aggravates the undercutting effect of the vortexes on the bed surface, therefore, not only can it not play a protective role, but it may even play the opposite role.

SUMMARY

Aiming at the shortcomings of the prior art, the present application provides a pier scour protection method by combinating a downward bivariate normal distribution surface and a granular mixture, and the specific technical solution is as follows:

The present application relates to a pier scour protection method by combinating a downward bivariate normal distribution surface and a granular mixture, which is used for protecting a pier foundation of a sea-crossing or river-crossing bridge from scouring, and when a depth of a local scour hole around a bottom of a pier or a bridge pile reaches a set depth, a concave revolving normal curved surface protection structure is laid, and the granular mixture with a specific thickness is laid in the revolving normal curved surface protection structure.

Furthermore, the downward bivariate normal distribution surface protection structure is a section of a revolving normal curved surface shell with a thickness of $\alpha$; by taking an intersection point between a center of the pier and a river bed plane that has not been washed as an origin, a water flow direction as a positive direction of an x axis, a direction perpendicular to the water flow direction in a horizontal plane as a y axis, a downward direction of an axis of the pier as a positive direction of a Z axis, an inner surface of the bivariate normal distribution surface shell which satisfies the following equation $$z = h_0 + \frac{1}{\sqrt{2\pi}\,\sigma} \exp\left(-\frac{x^2 + y^2}{2\sigma^2}\right)$$

$$\sqrt{x^2 + y^2} > \frac{D}{2} + l$$

where x, y, z are the coordinates of points of the inner surface of the bivariate normal distribution surface shell, l is a distance of a gap between the inner surface of the bivariate normal distribution surface shell and a surface of the pier $\sigma$ is a variance value related to a range of the scour hole, $h_0$ is a distance from an upper part of the bivariate normal distribution surface shell to the bed surface. A bottom of the bivariate normal distribution surface is located at $mh_b$ below a bed surface, where $h_b$ is a maximum depth of the scour hole, and m=0.7-0.9.

Furthermore, a ratio $\lambda$ of a thickness $\Delta h$ of the granular mixture layer to the maximum depth $h_b$ of the scour hole the satisfies the following conditions:

$$0 < \lambda \leq 1 - \frac{(F_w - \mu G')}{G' + (F_w - \mu G')\cot\beta} \frac{L}{h_b}$$

$$G' = \frac{1}{6}\pi d^3(\rho - \rho_w)g$$

where G' is the effective gravity of particles of the granular mixture; $F_w$ is the water flow force; μ is the friction coefficient of the bed surface of the scour hole; L is the length of the scour hole; α and β are angles between slope surfaces in the front and back of the scour hole and a horizontal plane, and $\rho_w$ is the water density.

Furthermore, the bivariate normal distribution surface protection structure further comprises a cylindrical sleeve-shaped base inserted into a riverbed for fixing the bivariate normal distribution surface shell, a thickness of the base is the same as that of the bivariate normal distribution surface shell, and an inner surface of the base satisfies the following relationship:

$$\begin{cases} \sqrt{x^2 + y^2} = \frac{D}{2} + l \\ z \in (mh_b, mh_b + h_c) \end{cases}.$$

Furthermore, α=0.1-0.3 m, and $h_c$=1-2 m.

Furthermore, a particle size d of the granular mixture is 3-5 times of the particle size of sediment in the incipient motion under the action of an extreme flow velocity in local natural conditions.

The present application has the following beneficial effects:

The main causes of local scour around the pier are the downflow and horseshoe-shaped vortex. The protection system of the present application organically combines the bivariate normal distribution surface structure in the scour hole to defend the downflow and the granular mixture layer to weaken the horseshoe-shaped vortex. The downwrd bivariate normal distribution surface structure is mainly used to defend the downflow in front of the pier, and the granular mixture layer can reduce the horseshoe-shaped vortex around the pier. During the use of the bridge, the protection system can reduce the energy of the downflow and horseshoe-shaped vortex around the pier, reduce local scour and effectively protect the pier foundation.

DESCRIPTION OF EMBODIMENTS

The purpose and effect of the present application will become clearer from the following detailed description of the present application according to the drawings and preferred embodiments. It should be understood that the specific embodiments described here are only intended to explain the present application, rather than to limit the present application.

Figure 1:
FIG. 1 shows the stress of the granular mixture on the slope.

Firstly, the stress of the granular mixture in the scour hole at a pier will be introduced. As shown in FIG. 1, the force exerted on the surface of the scour hole by particles of the granular mixture can be simplified as gravity, bed resistance, buoyancy force and water flow force.

Gravity of the granular mixture:

$$G = \frac{1}{6}\pi d^3 \rho g$$

Buoyancy force:

$$F_T = \frac{1}{6}\pi d^3 \rho_w g$$

Effective gravity: $G' = G - F_T$

Flow force:

$$F = \frac{1}{2}C_D \rho_w u^2 A,$$

where A is an area of an upstream face:

$$A = \frac{1}{4}\pi d^2,$$

$C_D$ is a thrust coefficient;

Bed resistance: $f_1$-the friction force exerted on the particles at the bottom of the scour hole.

$f_2$-the friction force exerted on the particles on the slope of the scour hole.

d is the diameter of the granular mixture; u is the water flow velocity; ρ is the density of the granular mixture; $\rho_w$ is water density; g is the acceleration of gravity, which is 9.8 N/kg.

Figure 2:
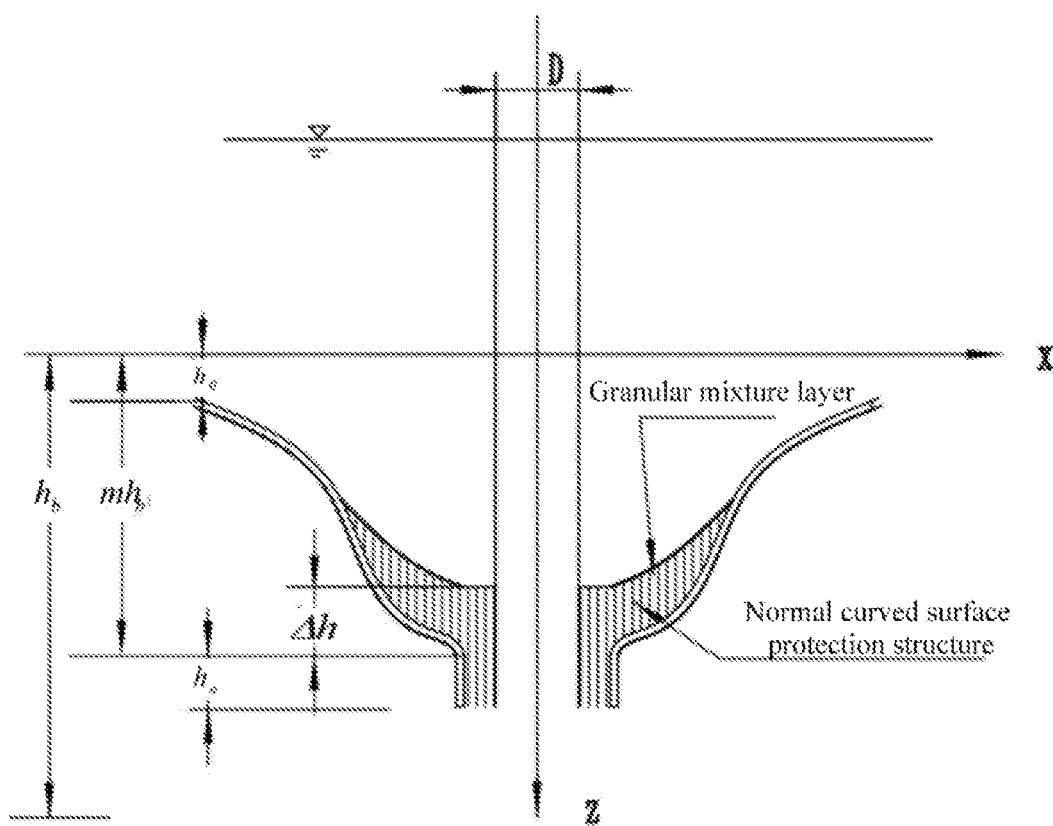
FIG. 2 is a side view of local scour protection around the pier with combination the downward bivariate normal distribution surface and a granular mixture.

According to the field observation data of a sea-crossing bridge, in the tidal-dominated channel estuary environment, the lengths of the front and rear scour holes of the pier are basically equal, and the angles between the slopes of the front and rear scour holes and the horizontal direction are also roughly equal. As shown in FIG. 2, it is a pier scour protection device with combinating the bivariate normal distribution surface and granular mixture. When the local scour holes around the bottom of the pier or bridge pile reach a set depth, the bivariate normal distribution surface protection structure is laid, and a granular mixture with a specific thickness is laid inside the bivariate normal distribution surface protection structure. The bivariate normal distribution surface protection structure is a section of the bivariate normal distribution surface shell with a thickness of α. The shape of the pier scour protection device will be introduced in detail below.

Furthermore, the bivariate normal distribution surface protection structure is a section of the bivariate normal distribution surface shell with a thickness of α, a bottom of the bivariate normal distribution surface is located at $mh_b$ below a bed surface, where $h_b$ is a maximum depth of the scour hole, and m=0.7-0.9. By taking an intersection point between a center of the pier and a river bed plane that has not been washed as an origin, a water flow direction as a positive direction of an x axis, a direction perpendicular to the water flow direction in a horizontal plane as a y axis, a downward direction of an axis of the pier as a positive direction of a Z axis, an inner surface is the bivariate normal distribution surface shell satisfying the following equation:

$$z = h_0 + \frac{1}{\sqrt{2\pi}\,\sigma}\exp\left(-\frac{x^2+y^2}{2\sigma^2}\right)$$

$$\sqrt{x^2+y^2} > \frac{D}{2} + l$$

where x, y, z are the coordinates of points of the inner surface of the bivariate normal distribution surface shell, l is a distance of a gap between the inner surface of the bivariate normal distribution surface shell and a surface of the pier after the bivariate normal distribution surface shell is sleeved on the pier; σ is a variance value related to a range of the scour hole, $h_0$ is a distance from an upper part of the normal curved surface shell to the bed surface. A bottom of the bivariate normal distribution surface is located at $mh_b$ below a bed surface, where $h_b$ is a maximum depth of the scour hole, and m=0.7-0.9.

After the scour hole is formed, the normal curved surface structure is sunk into the scour hole. Due to its own weight, the structure will compact the sediment in the hole and fix it onto the surface of the scour hole.

Further, in order to firmly fix the revolving normal curved surface protection structure, a section of a cylindrical sleeve-shaped base is continuously provided at the lower end of the revolving normal curved surface protection structure, and vertically inserted into the sediment layer, so that the bivariate normal distribution surface protection structure is fixed on the riverbed at the bottom of the scour hole. The bivariate normal distribution surface protection structure also comprises a cylindrical sleeve-shaped base inserted into the riverbed for fixing the normal curved surface shell, the thickness of which is the same as that of the bivariate normal distribution surface shell, and the inner surface of the cylindrical sleeve-shaped base satisfies the following relationship:

$$\begin{cases} \sqrt{x^2+y^2} = \frac{D}{2}+l \\ z \in (mh_b, mh_b + h_c) \end{cases}$$

When the base is provided, $h_c$ is the depth at which the bivariate normal distribution surface protection structure is inserted into the bottom of the riverbed. Further, a=0.1-0.3 m, $h_c$=1-2 m.

Figure 3:
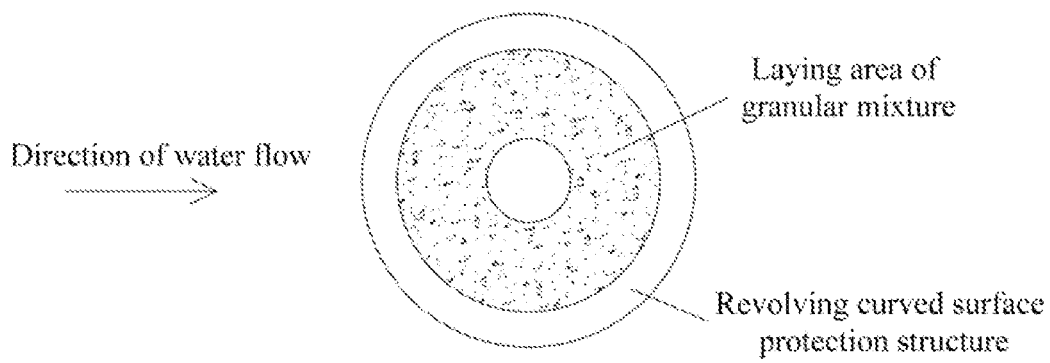
FIG. 3 is a top view of local scour protection around the pier with combinating the downward bivariate normal distribution surface and granular mixture.

FIG. 3 is a top view of the protection structure and the granular mixture. The particle size d and thickness Δh of the laid granular mixture are determined through the analysis on the stress of the granular mixture on the bivariate normal distribution surface according to the calculation method of the starting velocity of the granular mixture slope, so as to play the most effective protective function. On the one hand, the particle size d and laying thickness Δh of the granular mixture can ensure that the granular mixture will not be moved out of the scour hole; on the other hand, the abrasion of the granular mixture to the structure can be avoided. There is a certain gap between the bivariate normal distribution surface structure and the pier to avoid impact force on the pier. Therefore, the thickness of the granular mixture layer is determined as follows.

If it is ensured that the particles will not be washed away from the protection structure, the following conditions should be satisfied: before the particles are washed to the edge of the bivariate normal distribution surface protection structure, the velocity thereof should be reduced to zero and fall back to the bottom of the scour hole, that is, the sum of the positive work done by the water flow force and the buoyancy force is less than the sum of the negative work done by the gravity and the surface resistance. In addition, it is assumed that the original maximum scour depth is $h_b$, the water flow velocity is u, the pier diameter D, μ is a resistance coefficient of the surface of the granular mixture layer in the scour hole. The thickness of the paved granular mixture layer is $\Delta h = \lambda h_b$, the particle size is d, and the flow velocity under extreme hydrodynamic conditions is $u_2$. Namely, $W_{F_w} + W_{FT} \leq W_G + W_f$.

The following can be obtained by deformation:

$$0 < \lambda \leq 1 - \frac{(F_w - \mu G')}{G' + (F_w - \mu G')\cot\beta} \cdot \frac{L}{h_b}$$

$$G' = \frac{1}{6}\pi d^3(\rho - \rho_w)g$$

where G' is an effective gravity of particles of the granular mixture; $F_w$ is a water flow force; μ is a friction coefficient of the bed surface of the scour hole; L is a length of the scour hole; α and β are angles between slope surfaces in the front and back of the scour hole and a horizontal plane, and $\rho_w$ is a water density.

Preferably, the particle size of the adopted granular mixture is 3-5 times of the particle size of sediment in the incipient motion under the action of an extreme flow velocity in local natural conditions (before a bridge is built).

The pier scour protection device combined with a downward bivariate normal distribution surface and a granular mixture of the present application is laid in local scour holes around the pier, and the vortex is eliminated by the gaps in the granular mixture and the energy of the vortex body is consumed by the movement of the granular mixture on the slope, so as to reduce the intensity of the water flow turbulence and horseshoe-shaped vortex around the pier and reduce the scouring effect of horseshoe-shaped vortex on the pier and its protection structure. The gap between the particles can reduce the wake vortex around the pier and effectively absorb the energy of the horseshoe-shaped vortex. At the same time, the granular mixture will move obliquely away from the pier along the bivariate normal distribution surface under the action of downflow, and then fall back under the action of gravity, converting the kinetic energy of the water flow into the kinetic energy and potential energy of the granular mixture, which can further consume the energy of the downflow and horseshoe-shaped vortex. The weight of the granular mixture layer increases the compaction effect of the bivariate normal distribution surface structure on the sediment under the structure, which is helpful to maintain the stability of the protection structure.

For other aquatic buildings, the corresponding curved surface structure and granular mixture can be designed with reference to the protection method provided by the present application, and the present application has a guiding effect on the foundation scour protection of aquatic buildings.

It can be understood by those skilled in the art that the above description is only the preferred examples of the present application, and is not intended to limit the present application. Although the present application has been described in detail with reference to the foregoing examples, those skilled in the art can still modify the technical solutions described in the foregoing examples or replace some of their technical features equivalently. Within the spirit and principle of the present application, the modifications, equivalent replacements and the like shall be included within the scope of protection of the present application.

What is claimed is:

1. A pier scour protection method by combining a downward bivariate normal distribution surface and granular mixture, wherein the method is used for protecting a pier foundation of a sea-crossing or river-crossing bridge from scouring, laying a protection structure in a shape of a downward bivariate normal distribution surface when a depth of a local scour hole around a pile or a bridge pier reaches a given depth, and paving a bottom of a rotationally symmetric surface with the granular mixture with a specific thickness, wherein the bottom of the rotationally symmetric surface is located at $mh_b$ below a bed surface, where $h_b$ is a maximum depth of the scour hole, and m=0.7-0.9.

2. The pier scour prevention method by combining a downward bivariate normal distribution surface and granular mixture according to claim 1, wherein a bivariate normal distribution surface protection structure is a section of a bivariate normal distribution surface shell with a thickness of α; by taking an intersection point of the axis of the pier and an initial river bed as an origin, a water flow direction as the positive direction of an x-axis, a direction perpendicular to the water flow in a horizontal plane as a y-axis, a downward direction as a positive direction of a Z-axis, an inner surface of the bivariate normal distribution surface shell satisfies the following equation:

$$z = h_0 + \frac{1}{\sqrt{2\pi}\,\sigma}\exp\left(-\frac{x^2+y^2}{2\sigma^2}\right)$$

$$\sqrt{x^2+y^2} > \frac{D}{2}+l$$

where l is a shortest distance between the inner surface of the bivariate normal distribution surface shell and the pier surface; σ is a standard deviation of the normal distribution, $h_0$ is a distance from an upper part of the bivariate normal distribution surface shell to the bed surface.

3. The pier scour prevention method by combining a downward bivariate normal distribution surface and granular mixture according to claim 1, wherein a ratio λ of a thickness Δh of the granular mixture layer to the maximum depth $h_b$ of the scour hole satisfies the following conditions:

$$0 < \lambda \le 1 - \frac{(F_w - \mu G')}{G' + (F_w - \mu G')\cot\beta}\frac{L}{h_b}$$

an effective gravity of particles of the granular mixture: $G'=G-F_T$ a gravity of the granular mixture:

$$G = \frac{1}{6}\pi d^3 \rho g$$

a buoyant force:

$$F_T = \frac{1}{6}\pi d^3 \rho_w g$$

a flow force:

$$F = \frac{1}{2}C_D \rho_w u^2 A,$$

where A is an area of an upstream face:

$$A = \frac{1}{4}\pi d^2, C_D$$

is a drag coefficient;

where $F_w$ is a water flow force; μ is a friction coefficient of the surface of the scour hole; L is a length of the scour hole; α and μ are angles between slope surfaces of the scour hole and a horizontal plane, respectively, and $\rho_w$ is a water density.

4. The pier scour protection method by combining of a downward bivariate normal distribution surface and a granular mixture according to claim 3, wherein a bivariate normal distribution surface protection structure further comprises a cylindrical base inserted into a riverbed for fixing a shell, a thickness of the base is the same as that of the bivariate normal distribution surface, and an inner surface of the base satisfies the following relationship:

$$\begin{cases} \sqrt{x^2+y^2} = \frac{D}{2}+l \\ z \in (mh_b, mh_b + h_c) \end{cases}$$

where $h_c$=1-2 m is a height of the cylindrical base.

5. The pier scour protection method by combining a downward bivariate normal distribution surface and a granular mixture according to claim 4, wherein shell thickness α=0.1-0.3 m, and $h_c$=1-2 m.

6. The pier scour protection method combining a normal distribution by combining a downward bivariate normal distribution surface and a granular mixture according to claim 4, wherein a particle size d of the granular mixture is 3-5 times of that of sediment in the state of incipient motion under the action of an extreme flow velocity in local natural conditions.

* * * * *